US008925490B2

(12) United States Patent
Holder et al.

(10) Patent No.: US 8,925,490 B2
(45) Date of Patent: Jan. 6, 2015

(54) RECIRCULATING AQUACULTURE SYSTEMS AND BIOFILTERS THEREFOR

(71) Applicant: JLH Consulting Inc., Courtenay (CA)

(72) Inventors: John Leslie Holder, Courtenay (CA); Robert Scott McKinley, West Vancouver (CA)

(73) Assignee: JLH Consulting Inc., Courtenay (CA)

( * ) Notice: Subject to any disclaimer, the term of this patent is extended or adjusted under 35 U.S.C. 154(b) by 142 days.

(21) Appl. No.: 13/739,556

(22) Filed: Jan. 11, 2013

(65) Prior Publication Data

US 2013/0247832 A1 Sep. 26, 2013

Related U.S. Application Data

(60) Provisional application No. 61/586,671, filed on Jan. 13, 2012.

(51) Int. Cl.
| | |
|---|---|
| *A01K 63/04* | (2006.01) |
| *C02F 3/10* | (2006.01) |
| *C02F 3/08* | (2006.01) |
| *C02F 1/00* | (2006.01) |
| *C02F 1/20* | (2006.01) |
| *C02F 3/30* | (2006.01) |

(52) U.S. Cl.
CPC .............. *C02F 3/104* (2013.01); *A01K 63/045* (2013.01); *C02F 3/087* (2013.01); *C02F 1/001* (2013.01); *C02F 1/20* (2013.01); *C02F 3/303* (2013.01)
USPC .......................................... 119/260; 119/259

(58) Field of Classification Search
USPC ................................. 119/260, 259
See application file for complete search history.

(56) References Cited

U.S. PATENT DOCUMENTS

| | | | | |
|---|---|---|---|---|
| 5,054,424 | A * | 10/1991 | Sy | 119/260 |
| 5,176,100 | A * | 1/1993 | Fujino | 119/259 |
| 6,666,965 | B1 | 12/2003 | Timmons | |
| 7,527,730 | B2 | 5/2009 | Johannsson | |
| 7,807,053 | B2 * | 10/2010 | Smith | 210/167.22 |
| 8,141,515 | B2 * | 3/2012 | Nien | 119/226 |

OTHER PUBLICATIONS

Malone, Ronald F. and Beecher, Lance E., "Use of floating bead filters to recondition recirculating waters in warmwater aquaculture production systems", Aquaculture Engineering, 22(1-2): 57-73, 2000.

Summerfeldt, S.T., CIGR Handbook of Agricultural Engineering, vol. II Animal Production & Aquaculture Engineering, Part II Aquacultural Engineering, Chapter 13, Waste-Handling Systems, pp. 309-350, American Society of Agricultural and Biological Engineers, 1999.

Timmons, M.B. & J.M. Ebeling, Recirculating Aquaculture, NRAC Publication No. 01-007, 2007, pp. 305-309, 359-361. Print.

* cited by examiner

*Primary Examiner* — Kristen C Hayes
(74) *Attorney, Agent, or Firm* — Oyen Wiggs Green & Mutala LLP

(57) ABSTRACT

A biofilter is provided. The biofilter comprises a housing; an inlet defining an upstream end of the housing; an outlet defining a downstream end of the housing; a chamber comprising an upstream opening and a downstream opening, the chamber configured to contain a filtration medium; and a counter flow generator for generating a counter flow of water in an upstream direction in the chamber. Related methods and systems are also provided.

16 Claims, 12 Drawing Sheets

Flow Rate and Oxygen Use

| | |
|---|---|
| Total Volume of Culture Tanks | 195.00 m3 |
| Density | 90.00 kg/m3 |
| Biomass | 17550.00 kg |
| Feed Rate as % of Biomass | 1 % |
| Mass of Feed / Day | 175.5 kg feed / day |
| Total Oxygen Demand Rate wrt feed | 650 g O2 / kg feed |
| Total Oxygen Demand Per Day | 114.08 kg O2 / day |
| Culture Temperature | 28.0 C |
| O2 Sat. Concentration of Culture Water | 7.8 g O2 / m3 |
| % of Saturation Concentration Used | 168.3 % |
| O2 Concentration In to Culture Tank | 13.13 g O2 / m3 |
| O2 Concentration Out of Culture Tank | 5 g O2 / m3 |
| Supplementary O2 Required | 102.61 kg O2 / day |
| Flow Rate Required for Oxygenation | 585.00 m3 / hr |
| | 2576 gpm |
| | 20.00 min / tank exchange |

52.8 lpm    4.28 kgs/hr 29.3 lpm makeup    42.1 m3/day
7.7 gpm 21.6 %/day

| | |
|---|---|
| Protein Content of Food | 40 % |
| Net Protein Utilization (NPU) | 57 % |
| TAN Conversion Rate | 27.5 g TAN / kg feed |
| TAN Production Rate | 201.2 g TAN / hr |
| Percentage Recirculation | 99.7 % |
| Biofilter Efficiency | 40 % |
| Max Allowable NH3-N Concentration | 0.05 g NH3 - N / m3 |
| Water pH | 7.20 |
| Mole Fraction (NH3 - N) / TAN | 0.0112 |
| Max Allowable TAN Concentration | 4.443 g TAN / m3 |
| Biofilter Consumption Rate | 200.34 g TAN / hr |
| Flow Rate Req'd for Nitrification | 112.67 m3 / hr |
| | 496.09 gpm |
| | 103.84 min / tank exchange |

4.83 m3 of media req'd
19.32 sq. M. req'd
204.0 sq. ft.
4488 gpm
16986 lpm
1912 gpm internal rate Diameter of BF    16.11 feet
Square BF    14.3 feet Diameter of BF    4.911 meter
Square BF    4.35 meter

Comparison of TAN Levels in Flow Through and Recirc

| | |
|---|---|
| TAN Concentration In Flow Through | 0.34400 g TAN / m3 |
| TAN Concentration In Recirculation | 0.85615 g TAN / m3 |

Fig. 13

|  |  | Microbead | | Speece Cone | | Mirobead (internal) | | Pumps (internal spray) | |
|---|---|---|---|---|---|---|---|---|---|
|  |  | Input | Output | Input | Output | Input | Output | Input | Output |
| Total flowrate |  | 2576 gpm | 2576 gpm | 480 gpm | 480 gpm | 1912 gpm | 1912 gpm | 450 gpm | 450 gpm |
| Number of pumps |  |  | 2 |  | 1 |  | 3 |  | 2 |
| Flowrate per pump |  |  | 1288 gpm |  | 480 gpm |  | 637 gpm |  | 225 gpm |
| Design TDH |  | 6.6 ft | 6.6 ft | 40 ft | 40 ft | 3.3 ft | 3.3 ft | 3.0 ft | 3.0 ft |
| Assumed pump efficiency |  | 79% | 79% | 65% | 65% | 79% | 79% | 65% | 65% |
| Power required per pump |  |  | 2.7 HP |  | 7.5 HP |  | 0.7 HP |  | 0.3 HP |
| Total hp requirement |  |  | 5.4 HP |  | 7.5 HP |  | 2.0 HP |  | 0.5 HP |
| Cost of electricity | $0.08/kWh |  |  |  |  |  |  |  |  |
| Energy requirement | Daily |  | 97 kWh |  | 133 kWh |  | 36 kWh |  | 9 kWh |
|  | Monthly |  | 2997 kWh |  | 4138 kWh |  | 1102 kWh |  | 291 kWh |
|  | Yearly |  | 35285 kWh |  | 48726 kWh |  | 12975 kWh |  | 3426 kWh |
| Total energy cost | Daily |  | $7.73 |  | $10.68 |  | $2.84 |  | $0.75 |
|  | Monthly |  | $239.75 |  | $331.07 |  | $88.16 |  | $23.28 |
|  | Yearly |  | $2,822.84 |  | $3,898.08 |  | $1,038.02 |  | $274.08 |

|  | Per hour | Per day | Per year |
|---|---|---|---|
| Microbead filter | 5.5 | 132.2 |  |
| Solids filter | 1.5 | 36 |  |
| Kasco aerators | 1.1 | 25.5 |  |
| Internal pumps | 0.4 | 9.4 |  |
| Speece cone - OY110 | 5.6 | 133.5 |  |
| Foam fractionator | 5.6 | 134.4 |  |
| Total kWh | 19.6 | 471 | 171917 |

| Crops | per tank | per year | Energy cost | Energy cost | Dollar cost |
|---|---|---|---|---|---|
| 3 tank system | 17550 kg | 52650 kg | 3.27 kWh/kg | 1.48 kWh/lb | $0.12/lb |
| 4 tank system | 17550 kg | 70200 kg | 2.45 kWh/kg | 1.11 kWh/lb | $0.09/lb |

Kasco aerators    1 kg O2 consumed = 1/3 HP Kasco.
4.28 kg of O2 = 1.425 HP

Fig. 14

RECIRCULATING AQUACULTURE SYSTEMS AND BIOFILTERS THEREFOR

RELATED APPLICATION

This application claims priority to, and incorporates by reference in its entirety, U.S. provisional patent application No. 61/586,671 filed 13 Jan. 2012.

TECHNICAL FIELD

This invention relates to apparatus and methods for biofiltration of water for recirculating aquaculture systems. This invention also relates to systems and methods for recirculating aquaculture employing such biofiltration apparatus and methods.

BACKGROUND

Nitrogenous compounds are a component of waste products generated by finfish and shellfish aquaculture. Ammonia and nitrite are toxic to finfish and shellfish. Removing ammonia and nitrite is essential, particularly for recirculating aquaculture systems. Biofilters remove toxic nitrogenous compounds by exposing aquaculture water to media colonized with nitrifying bacteria which oxidize ammonia and nitrite to less toxic nitrogenous compounds such as nitrate.

Micro bead biofilter (MBBF) systems filter water through a media bed comprising buoyant microbeads coated with a biofilm of nitrifying bacteria. Sufficient mixing of the media involves causing the microbeads to continuously move from a top of the media bed to the bottom of the media bed and then back to the top of the media bed again. Hydraulic loading rate refers to the rate of water flow required for sufficient mixing to occur. Sufficient mixing is necessary for proper nitrification and aeration, and to prevent clogging and excess biomass buildup.

In typical MBBF systems media beds are relatively shallow due to bed depth being limited by the necessity for sufficient media mixing and, in turn, limited by the energy available for media mixing. Energy is provided solely by gravity flow of water, which satisfies hydraulic loading rate requirements for media beds contained in chambers only up to about 18" (45 cm) deep. Given limited media bed depth, increasing nitrification capacity of known MBBF systems requires increasing the footprint of the media bed, resulting in greater capital costs. Media beds of known MBBF systems also tend to "bunch" near the bottom of the chambers due to the downward gravity flow of water; this bunching lowers nitrification capacity and interferes with water flow through the chambers.

In addition to ensuring proper nitrification, lowering energy costs is another significant issue in aquaculture operations. Energy costs are a major factor in the profitability of recirculating aquaculture systems. Electricity for meeting the pumping requirements of recirculating aquaculture systems represents a significant portion of these energy costs.

Efficient and cost-effective biofilters and recirculating aquaculture systems are desirable.

SUMMARY

According to one aspect a biofilter is provided. The biofilter comprises a housing; an inlet defining an upstream end of the housing; an outlet defining a downstream end of the housing; a chamber comprising an upstream opening and a downstream opening, the chamber configured to contain a filtration medium; and a counter flow generator for generating a counter flow of water in an upstream direction in the chamber.

The counter flow generator may comprise a water jet assembly comprising a water jet outlet. The water jet outlet may be adjacent to the downstream opening of the chamber. The water jet assembly may comprise an intake for supplying to the water jet outlet, wherein the intake is configured to draw water from within the housing downstream of the water jet outlet. The biofilter may comprise a plurality of chambers and a plurality of water jet outlets, wherein at least one water jet outlet is adjacent to a downstream opening of each chamber.

The total counter flow of water generated may be equal to about 5% to 15%, 8% to 12%, or about 10% of the total flow rate of water flowing downstream through the biofilter. The depth of the chamber may be greater than 2 feet (0.6 cm). The chamber may be located in an upper half of the housing. The chamber may be located in an upper third of the housing. The biofilter may comprise a perforated distribution plate adjacent the upstream opening of the chamber for distributing water to the chamber.

The biofilter may comprise a discharge manifold, the discharge manifold comprising: an intake adjacent to a bottom of the housing; the outlet defining the downstream end of the housing; a conduit connecting the intake to the outlet; wherein the outlet and a downstream portion of the conduit are located along a substantially horizontal plane adjacent to the downstream opening of the chamber. The discharge manifold may comprise a plurality of intakes, wherein the conduit comprises: a plurality of secondary conduits, wherein one secondary conduit connects to one intake, and a primary conduit connecting the secondary conduits to the outlet. The biofilter may comprise a plurality of discharge manifolds, wherein the plurality of intakes are spaced apart across the bottom of the housing.

The biofilter may comprise a recirculation conduit configured to recirculate water from a location downstream of the chamber to a location upstream of the chamber.

Another aspect provides a method of filtering in a biofilter. The method comprises: (a) providing water from a source to a filtration medium; (b) allowing the water to flow through the filtration medium in a downstream direction by gravity; and (c) simultaneously to step (b), providing a counter flow of water through the filtration medium in an upstream direction.

Step (c) may comprise providing the counter flow of water with one or more water jets. Step (c) may comprise providing a counter flow sufficient to, together with the gravity flow of water in the downstream direction, cause filtration medium to be churned between an upstream end of a media bed and a downstream end of the media bed.

Step (c) may comprise providing a total counter flow at a rate equal to about 5% to 15% of the total flow rate of water flowing downstream through the biofilter. Step (c) may comprise providing the total counter flow at a rate equal to about 8% to 12% of the total flow rate of water flowing downstream through the biofilter. Step (c) may comprise providing the total counter flow at a rate equal to about 10% of the total flow rate of water flowing downstream through the biofilter.

Step (a) may comprise providing water from the source to the filtration medium contained in a plurality of chambers. Step (c) may comprise providing a continuous counter flow of water.

The method may comprise performing steps (a) to (c) in an upper half of the biofilter. The method may comprise performing steps (a) to (c) in an upper third of the biofilter.

The method may comprise: (d) drawing water for discharge from the biofilter at a location adjacent to a bottom of the biofilter; (e) discharging water drawn at step (d) from the biofilter at an elevation immediately downstream of a chamber where steps (a) to (c) are performed.

The method may comprise recirculating a portion of water that has filtered through the filtration medium back to step (a).

Another aspect provides a recirculating aquaculture system. The system comprises a biofilter as described above; and a rearing tank in fluid communication with the inlet and the outlet of the biofilter. An elevation of an outlet of the rearing tank may be sufficiently above an elevation of the inlet of the biofilter to permit gravity feed of water from the rearing tank to the biofilter. The system may comprise a carbon dioxide stripping chamber directly downstream of the biofilter, the carbon dioxide stripping chamber comprising a surface agitation aerator, wherein a normal operating water level of the carbon dioxide stripping chamber is slightly below an elevation of the outlet biofilter.

The system may comprise: a pump in fluid communication with the carbon dioxide stripping chamber; a header tank comprising an outlet in fluid communication with the rearing tank, wherein the pump is configured to pump water from the carbon dioxide stripping chamber to the header tank.

An elevation of the outlet of the header tank may be above an elevation of an inlet of the rearing tank to permit gravity feed of water from the header tank to the rearing tank.

The system may comprise a solids separator downstream of the rearing tank and upstream of the biofilter, a mechanical filter downstream of the rearing tank and upstream of the biofilter, a foam fractionator downstream of the rearing tank and upstream of the biofilter, and/or an oxygenator downstream of the biofilter and upstream of the rearing tank.

A method of recirculating water in an aquaculture system is provided. The method comprises gravity feeding water from a rearing tank to a biofilter as described above. The method may comprises gravity feeding water from the biofilter to a surface agitation aerator to remove carbon dioxide and add oxygen to the water, pumping water from the surface agitation aerator to a header tank, gravity feeding water from the header tank to the rearing tank, separating solids from the water upstream of the biofilter, subjecting the water to mechanical filtration upstream of the biofilter, subjecting the water to foam fractionation upstream of the biofilter, and/or subjecting the water to oxygenation downstream of the surface agitation aerator.

BRIEF DESCRIPTION OF DRAWINGS

In drawings which show non-limiting embodiments of the invention:

FIG. 13 is a table showing operating parameters for an example embodiment of the invention; and FIG. 14 is a table showing operating parameters and energy costs for an example embodiment of the invention.

DESCRIPTION

Figure 1:
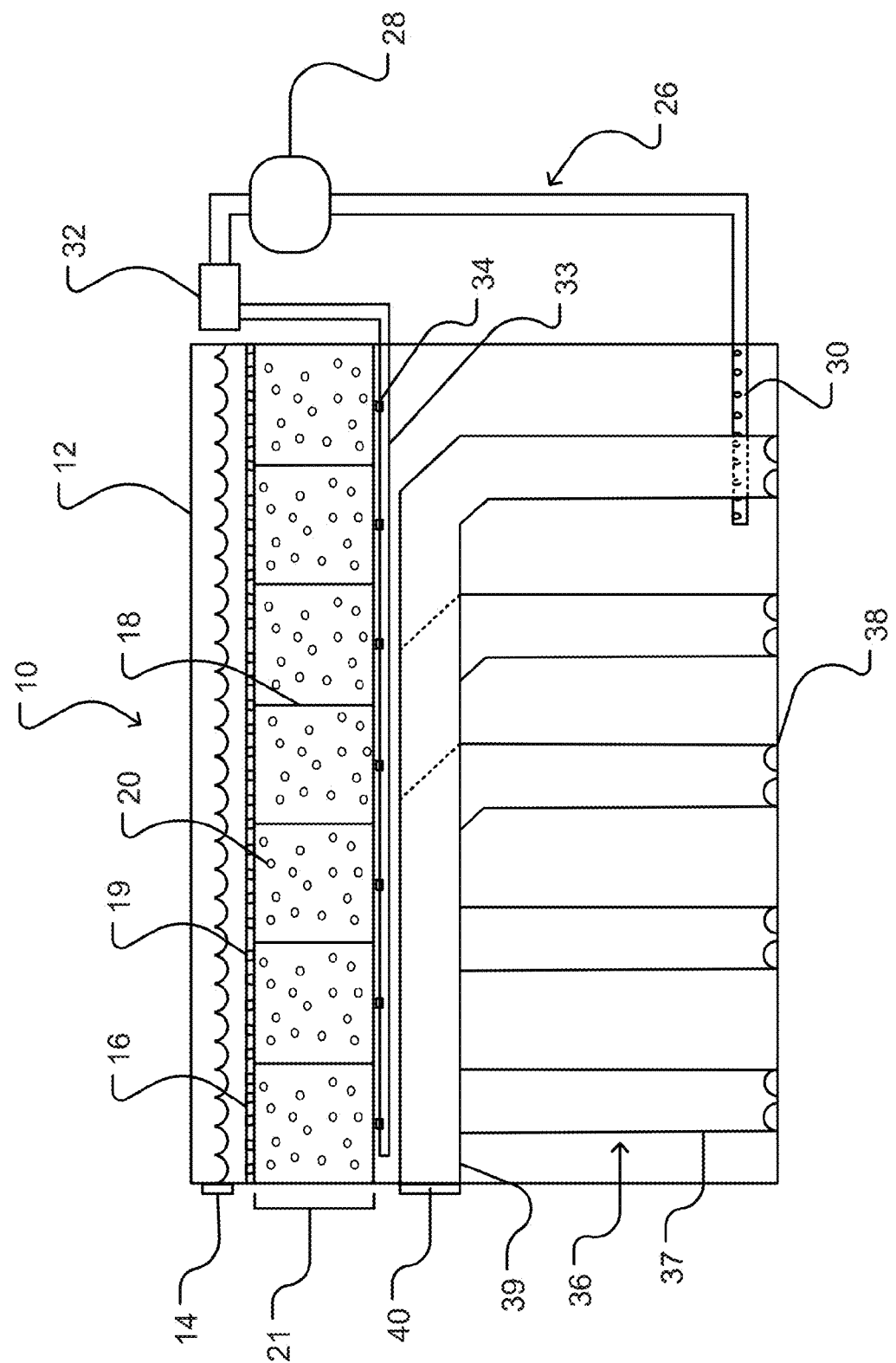
FIG. 1 is a front elevation see-through view of a biofilter according to an embodiment of the invention.
Figure 2:
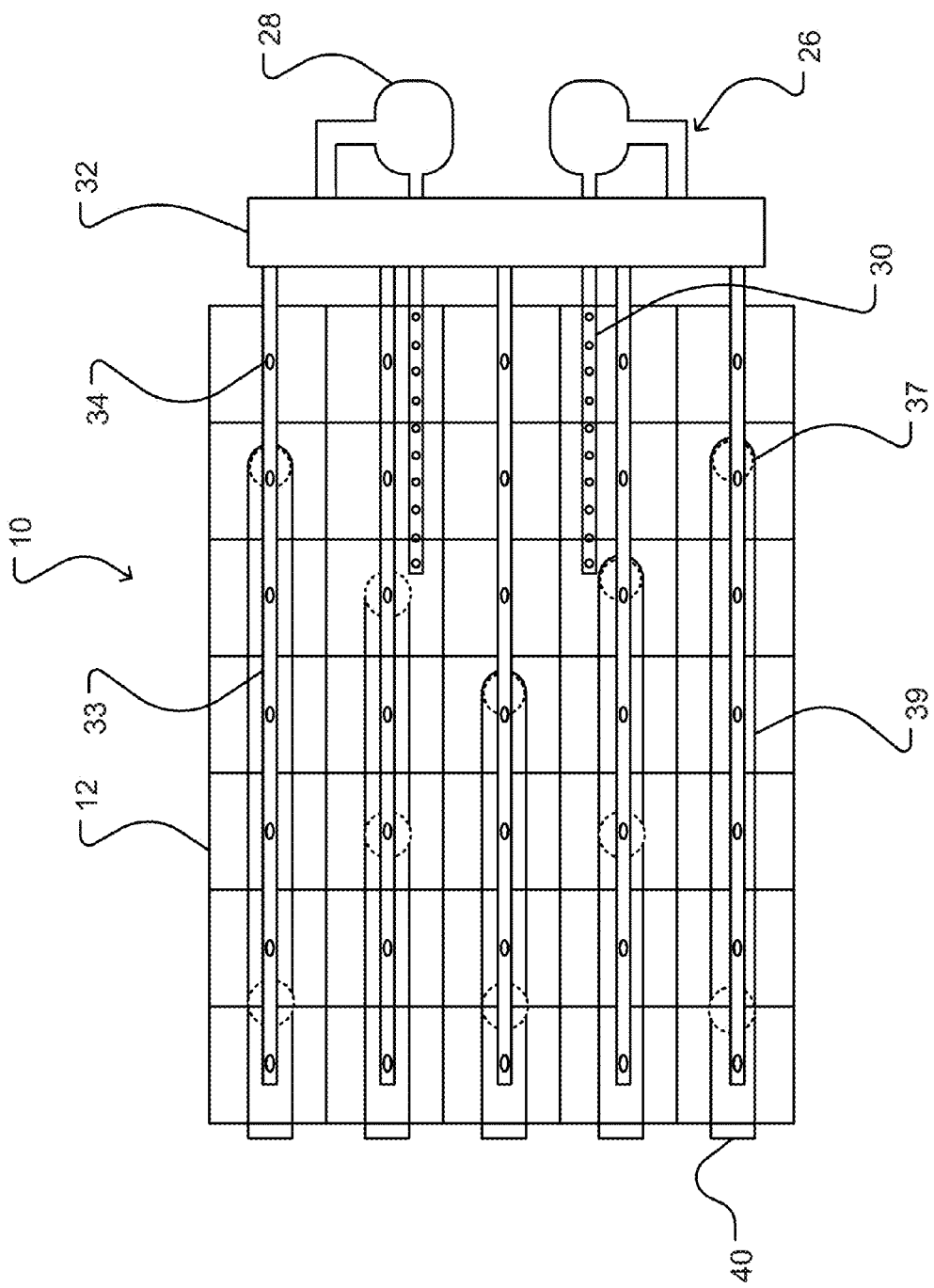
FIG. 2 is a top plan see-through view of the embodiment illustrated in FIG. 1.
Figure 3:
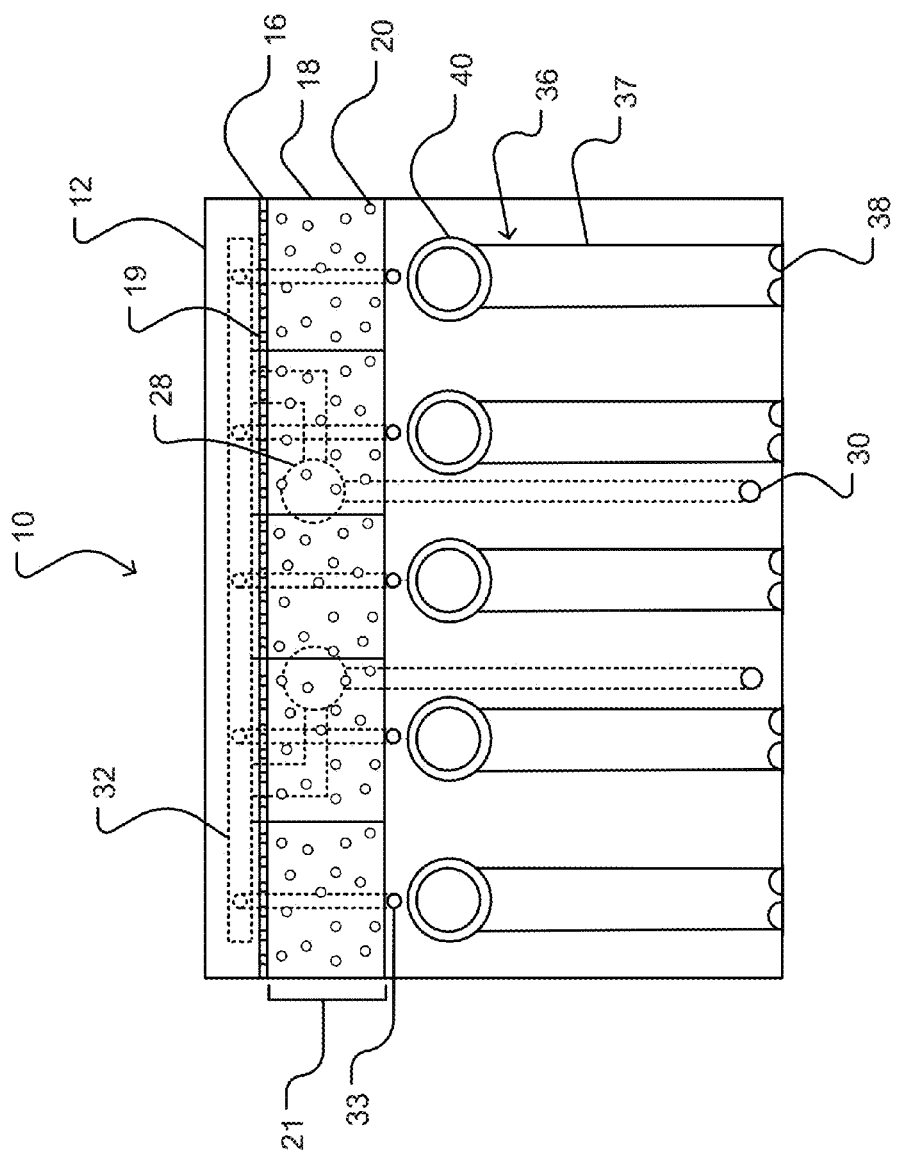
FIG. 3 is a left elevation see-through view of the embodiment illustrated in FIG. 1.
Figure 4:
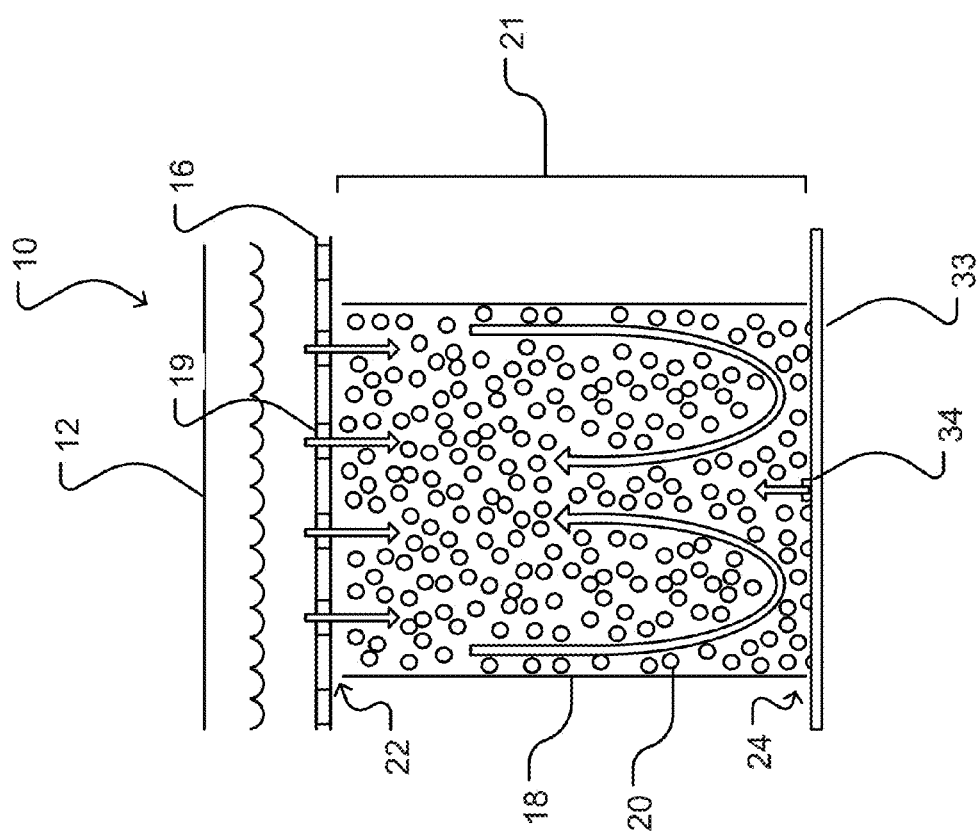
FIG. 4 is a partial front elevation see-through view of the embodiment illustrated in FIG. 1.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

While the present description focuses on aquaculture, it is to be understood that the invention may also be practiced in other water treatment processes involving biofiltration including but not limited to municipal wastewater treatment, industrial wastewater treatment and drinking water treatment.

The term "aquaculture" as used in this specification refers to culturing of animal and/or plant species in an aqueous environment. Examples of cultured animal species include finfish and shellfish. Examples of cultured plant species include seaweed, algae and moss.

The term "recirculating aquaculture system" as used in this specification refers to closed and quasi-closed aquaculture systems wherein water is treated and reused in the system.

The term "water" as used in this specification refers to fresh water, salt water, or any other aqueous medium suitable for aquaculture of the animal and/or plant species being cultured.

Some embodiments of the invention relate to apparatus and methods for biofiltration of water that, simultaneous to the gravity flow of water through the filtration medium in a downstream direction, provide a counter flow of water through the filtration medium in an upstream direction to improve mixing of the filtration medium. In particular embodiments, the gravity flow of water through the filtration medium is in a downward direction, and the counter flow of water through the filtration medium is in an upward direction. Improved mixing increases biofiltration capacity and improves water flow. Said apparatus and methods may be used in recirculating aquaculture systems to remove toxic nitrogenous compounds such as ammonia and nitrites.

FIGS. 1 to 4 show a biofilter 10 according to an example embodiment of the invention.

Biofilter 10 has a housing 12. Water from an upstream source is received in housing 12 through inlet 14. Inlet 14 may receive water directly or indirectly from an aquaculture tank, for example. In some embodiments, a valve (not shown) may be provided at inlet 14 to control water flow through biofilter 10. In some embodiments a plurality of inlets may be provided, for example to receive water from a plurality of upstream sources. In some embodiments a plurality of inlets may be located about the perimeter of the housing to distribute water within the housing. The inlet may be of any shape or configuration suitable to receive water from an upstream source. For example, in some embodiments, the inlet may be an elongated opening configured to receive water from an adjacent upstream source of water via a weir.

Distribution plate 16 distributes water received through inlet 14 to a plurality of chambers 18. In some embodiments, for example in medium to large scale operations the biofilter may have a plurality of chambers. In other embodiments, for example in small scale operations, the biofilter may have a single chamber.

Distribution plate 16 has a plurality of perforations 19. The size, number and/or location of perforations 19 may be varied to achieve even distribution of water among chambers 18. In some example embodiments the perforations have a diameter of about 1 to 30 mm, or about 2 to 20 mm, or about 3 to 10 mm. In some example embodiments, a plurality of evenly spaced apart perforations may be provided above each chamber to provide an evenly distributed shower-like flow of water to each chamber.

In some embodiments, the distribution plate may be absent. Some embodiments include alternative or additional means for distributing water to chambers 18. For example, in some embodiments the inlet may be connected to one or more sprays or sprinklers configured to evenly distribute water among the chambers.

The normal operating water level of biofilter 10 is maintained at a level above distribution plate 16, for example about 4 to 8 inches (10 to 20 cm), or about 6 inches (15 cm), above distribution plate 16. The gravity-induced downstream flow of water into and through chambers 18 keeps filtration medium 20 from escaping from chambers 18 in an upstream direction. In some embodiments the bottom of distribution plate 16 and the top of chamber 18 may be separated by about 2 to 6 inches (5 to 15 cm). Maintaining the water level of biofilter 10 above distribution plate 16 promotes even distribution of water to chambers 18.

Chambers 18 have upstream ends 22 and downstream ends 24 which are open to allow unimpeded flow of water through chambers 18. In some example embodiments, the dimensions of the chambers may range from about 1 to 3 feet (0.3 to 1.0 m) in width, about 1 to 3 feet (0.3 to 1.0 m) in length, and about 2 to 3 feet (0.6 to 1.0 m) in depth, or about 2 to 3 feet (0.6 to 1.0 m) in width, about 2 to 3 feet (0.6 to 1.0 m) in length, and about 2 to 3 feet (0.6 to 1.0 m) in depth, or about 2 feet (0.6 m) in width, about 2 feet (0.6 m) in length and about 2 to 3 feet (0.6 to 1.0 m) in depth, or about 3 feet (1.0 m) in width, about 3 feet (1.0 m) in length and about 2 to 3 feet (1.0 m) in depth. In some embodiments, the width to length ratio of the chambers is selected from a range of about 1:1.5 to about 1.5:1. In some example embodiments, the width to length ratio of the chambers is about 1:1. Chambers 18 have rectangular cross-sections in the illustrated embodiment. In other embodiments, cross-sections of the chambers may be of any shape suitable for the mixing of the filtration medium in the chambers.

In some embodiments, such as the illustrated embodiment, the cross-sectional shape of the chambers is tessellating (e.g. triangles, rectangles, squares, hexagons). In other embodiments the cross-sectional shape of the chambers is non-tessellating (e.g. circles) and resulting gaps between the chambers are blocked to prevent water from bypassing the chambers. In other embodiments, only a single chamber may be present for holding the filtration medium.

Each chamber 18 contains a bed 21 of filtration medium 20. Filtration medium 20 is suitable as a substrate for colonization of microorganisms useful for water treatment. In embodiments where nitrification is desired, suitable microorganisms include bacteria, yeast, fungi and protozoa which can form a biofilm on filtration medium 20 and have the capacity to convert ammonia to nitrite and/or nitrite to nitrate. In some embodiments, the microorganisms include nitrifying bacteria, such as aerobic nitrifying bacterial species from the genera *Nitrosomonas* and *Nitrobacter*.

In some embodiments, filtration medium 20 comprises non-biodegradable water-buoyant particles, such as polystyrene microbeads or the like. The microbeads may be about 1 to 3 mm, or about 1 to 2 mm in diameter, for example.

Water from distribution plate 16 enters bed 21 by gravity flow and contacts nitrifying-bacteria colonized on filtration medium 20, resulting in the nitrification of toxic ammonia and nitrite in the water to nitrate. In some embodiments the gravity flow of water through bed 21 provides partial mixing of filtration medium 20, i.e., the gravity flow of water is sufficient to mix filtration medium 20 at the upstream end but not the downstream end of bed 21 due to the depth of bed 21; in other words, filtration medium 20 at the upstream end of bed 21 is pushed downstream but not all the way to the downstream end of bed 21 before floating back upstream, and filtration medium 20 at the downstream end of bed 21 remains relatively undisturbed.

Biofilter 10 also includes a water jet assembly 26. Water jet assembly 26 includes pumps 28 which pump water to water jet outlets 34 through water jet intakes 30, water jet manifold 32 and water jet conduits 33. In some embodiments the pumps may pump water to the water jet outlets from locations downstream of the water jet conduits. In other embodiments water may be pumped from other locations within the housing or from sources outside the housing.

Water jet outlets 34 are oriented upstream, that is, in a direction generally opposite to the downstream direction of the gravity flow of water through chambers 18. Water jet outlets 34 provide sufficient counter flow to push media at the downstream end of the media bed in an upstream direction to, in conjunction with the gravity flow of water in the downstream direction, cause sufficient mixing of the filtration medium, i.e., churning of the filtration medium such that filtration medium moves continuously between an upstream end of the media bed and a downstream end of the media bed. In some example embodiments, such as that illustrated in FIG. 4, sufficient mixing of the filtration medium is manifested by the movement of the filtration medium in a toroidal vortex (partially indicated by the curved arrows in FIG. 4).

Water jet outlets 34 are located at or adjacent to the downstream ends 24 of chambers 18. In other embodiments the water jet outlets may be located in other locations that still provide sufficient counter flow of water to be generated in the chambers. For example, the water jet outlets may be provided at a predetermined distance below chambers 18 and the flow of water from the water jet outlets may be adjusted to account for this predetermined distance to ensure generation of sufficient counter flow in the chambers to provide sufficient mixing of the filtration medium.

In some embodiments, the gravity flow of water through the chamber is substantially downward and the counter flow of water, and the orientation of the water jet outlets, are substantially upward. In other embodiments the configuration of the chambers and/or the water jet outlets may be such that the gravity flow of water and/or counter flow of water generated by the water jet assembly may be in one or more non-vertical directions.

The counter flow of water generated by water jet assembly 26 provides improved filtration medium mixing capacity compared to known systems. By improving filtration medium mixing capacity, some embodiments of the invention provide advantages over known systems including:

enhanced nitrification capacity due to greater exposure of water to the filtration medium and elimination/reduction of bunching;

increased media bed depth due to greater energy available for mixing, allowing for increased nitrification capacity without increasing footprint. While media bed depth could be increased by increasing the energy of the gravity flow of water, for example by pumping water to a higher elevation either upstream or downstream of the biofilter to provide a greater gravity drop of water over the biofilter, the cost of power to provide the additional pumping would be greater than the cost of providing a counter flow of water; and reduced restriction/resistance to water flow due to elimination/reduction of bunching.

In some embodiments, the total flow rate from water jet outlets 34 is in the range of about 5% to 15%, or about 8% to 12%, or about 10%, of the total flow rate of water flowing in the downstream direction through biofilter 10.

In some embodiments, the water jet outlets may eject a narrow straight stream of water; in other embodiments the stream may be in the shape of a narrow or wide cone. In some embodiments, one or more water jet outlets may be provided for each chamber. In some example embodiments where the cross-sectional surface area of the chamber is about 4 feet square (0.36 m$^2$) (e.g. 2 feet (0.6 m) wide by 2 feet (0.6 m) long), one water jet outlet per chamber may be provided. In some embodiments where the cross-sectional surface area of the chamber is about 9 feet square (1.0 m$^2$) (e.g. 3 feet (1.0 m) wide by 3 feet (1.0 m) long), two water jet outlets per chamber may be provided. In some embodiments, the water jet outlets may eject water in a continuous stream; in other embodiments water may be ejected in a continuous and/or pulsed stream. In some embodiments the water jet outlets are oriented directly upstream (e.g. vertically upwards); in other embodiments the water jet outlets are oriented away from a directly upstream direction (e.g. angled upward away from the vertical). In some embodiments, the water jet outlets are stationary; in other embodiments the water jet outlets may be moveable (e.g. the water jet outlets may rotate or oscillate, thereby causing the stream to move in a corresponding manner).

Intakes 30 of water jet assembly 26 are located at or near the bottom of housing 12. Pump 28 pumps water that has been filtered through media bed 21 from intakes 30 through manifold 32 through water jet conduits 33 to water jet outlets 34. Drawing water from within housing 12 promotes further nitrification of the water drawn into water jet assembly 26. In some embodiments, the water jet assembly may draw water from elsewhere in the housing, or from an external source outside the housing.

Chambers 14 and water jet conduits 33 are located within the top one half, or top one third, of the housing. This minimizes static head of the biofilter compared to prior MBBF systems which require significant open space above the chambers to permit carbon dioxide stripping of the water prior to biofiltration. As discussed further below, in some embodiments of recirculating aquaculture systems according to the invention, the biofilters described herein may be used in conjunction with surface agitation aerators that provide carbon dioxide stripping without the need for additional static head at the biofilter.

In some embodiments, the water-filled bottom one half, or bottom two thirds, of the housing allows undesirable, denser fractions of filtration medium to be separated from the media bed. Filtration media typically includes fractions with specific densities and sizes outside of the designated ranges and which can interfere with the performance of the biofilter. The water-filled portion of the housing also provides sufficient distance between the bottom of the media bed and the inlets of the discharge manifolds at the bottom of the housing to reduce or prevent filtration medium from being drawn into the inlets of the discharge manifolds and carried downstream. In some example embodiments, the distance between the bottom of the media bed and the bottom of the housing is 4 feet (1.3 m) or more.

Biofilter 10 also includes a plurality of discharge manifolds 36 for discharging filtered water from biofilter 10 downstream to additional treatment processes or back to the aquaculture tank. Each discharge manifold 36 includes one or more secondary conduits 37 each having an intake 38 located adjacent to the bottom of housing 12. Intakes 38 are spaced apart evenly along the bottom of housing 12 to prevent solids buildup along the bottom of housing 12. In the illustrated embodiment the edges of intakes 38 are scalloped to increase water flow into intakes 38. Secondary conduits 37 extend upward to connect to primary conduits 39. Primary conduits 39 extend laterally to connect to outlets 40. Primary conduits 39 run directly below chambers 18 and water jet conduits 33. In some embodiments, gravity pressure forces water through discharge manifolds 36 and out of biofilter 10 without the need for pumping. Channeling discharge water out at outlets 40 at a mid-region of housing 12 allows discharged water from biofilter 10 to flow directly, without underground conduits, into a chamber with surface agitation aerators for carbon dioxide stripping as described further below in some embodiments of recirculating aquaculture systems according to the invention.

Figure 5:
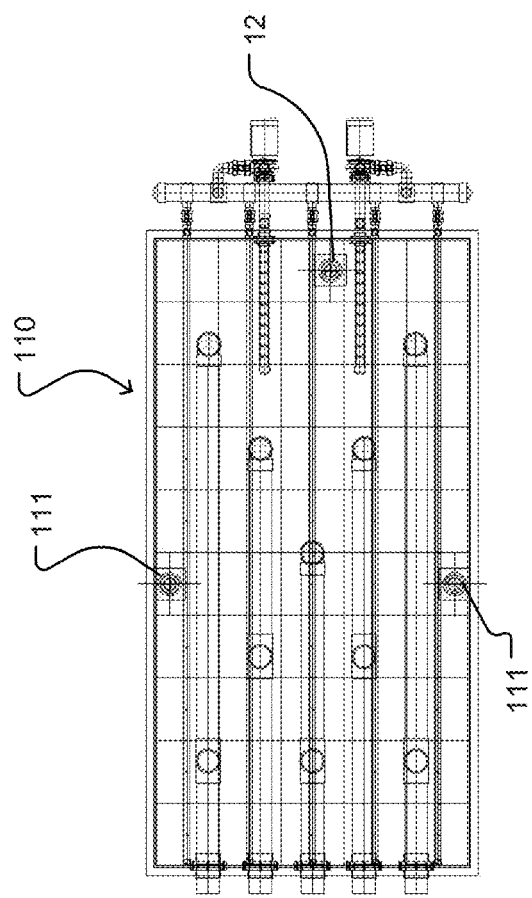
FIG. 5 is a top plan see-through view of a biofilter according to another embodiment of the invention.
Figure 7:
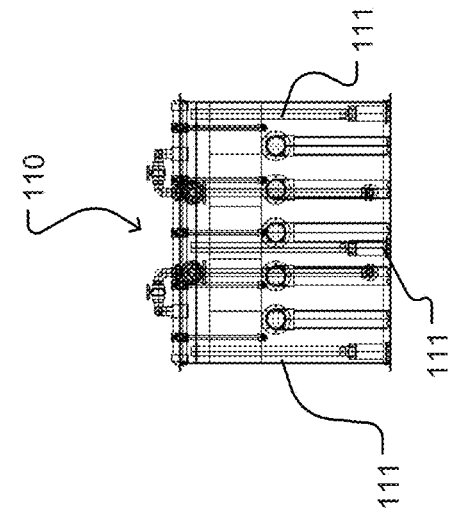
FIG. 7 is a left elevation see-through view of the embodiment illustrated in FIG. 5.
Figure 6:
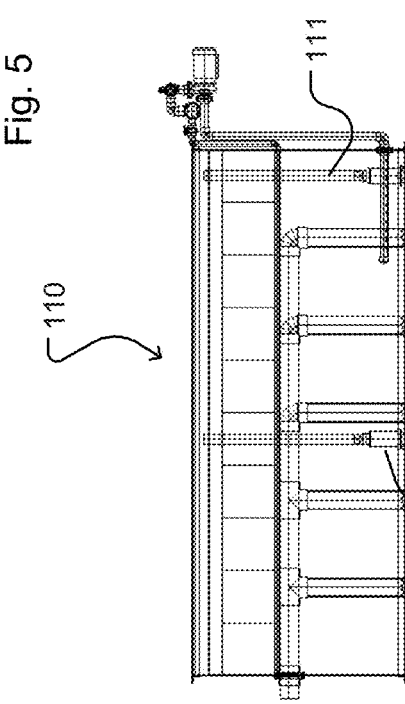
FIG. 6 is a front elevation see-through view of the embodiment illustrated in FIG. 5.

FIGS. 5 to 7 show a biofilter 110 according to another example embodiment of the invention. Biofilter 110 is similar to biofilter 10 but includes a plurality of pump-driven recirculation conduits 111. Conduits 111 recirculate water from a bottom region to a top region of biofilter 110 for redistribution to the filtration medium-containing chambers to promote further nitrification of the water, and to prevent or reduce bunching of the filtration medium. The pumps for recirculation conduits 111 can be controlled to deliver a suitable volume of water to the filtration medium-containing chambers.

Figure 8:
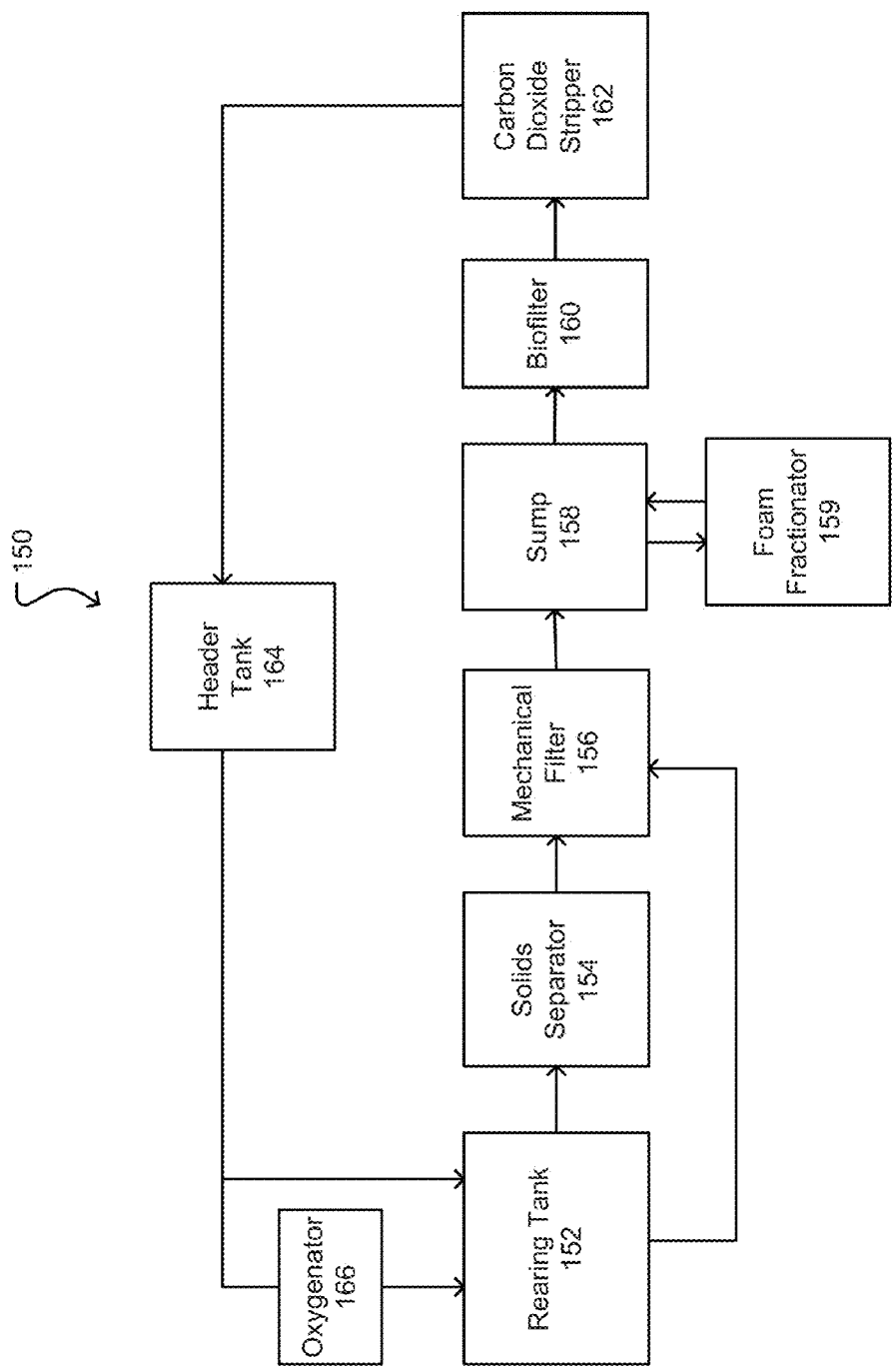
FIG. 8 is a block diagram of a recirculating aquaculture system according to an embodiment of the invention.
Figure 9:
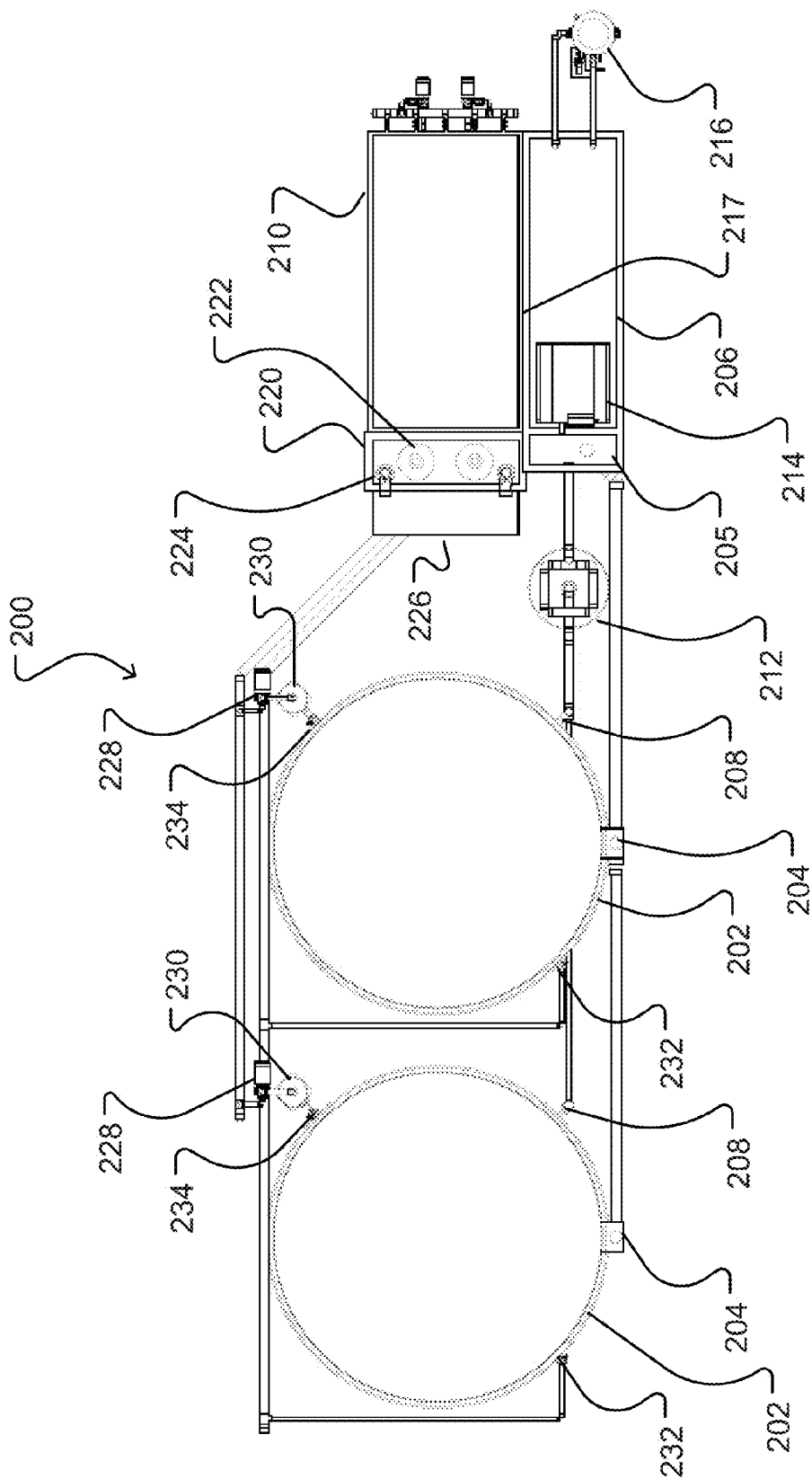
FIG. 9 is a top plan view of a recirculating aquaculture system according to another embodiment of the invention.
Figure 10:
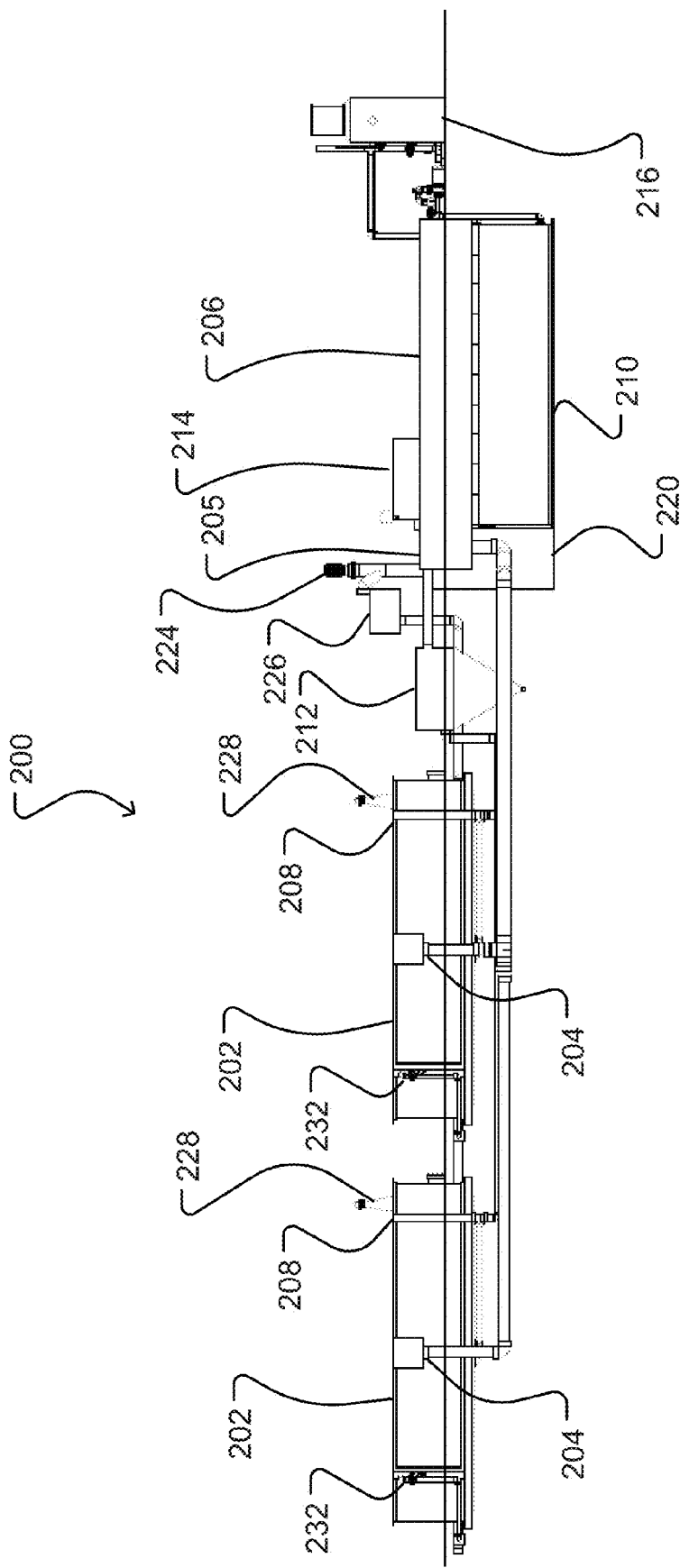
FIG. 10 is a front elevation view of the embodiment illustrated in FIG. 9.
Figure 11:
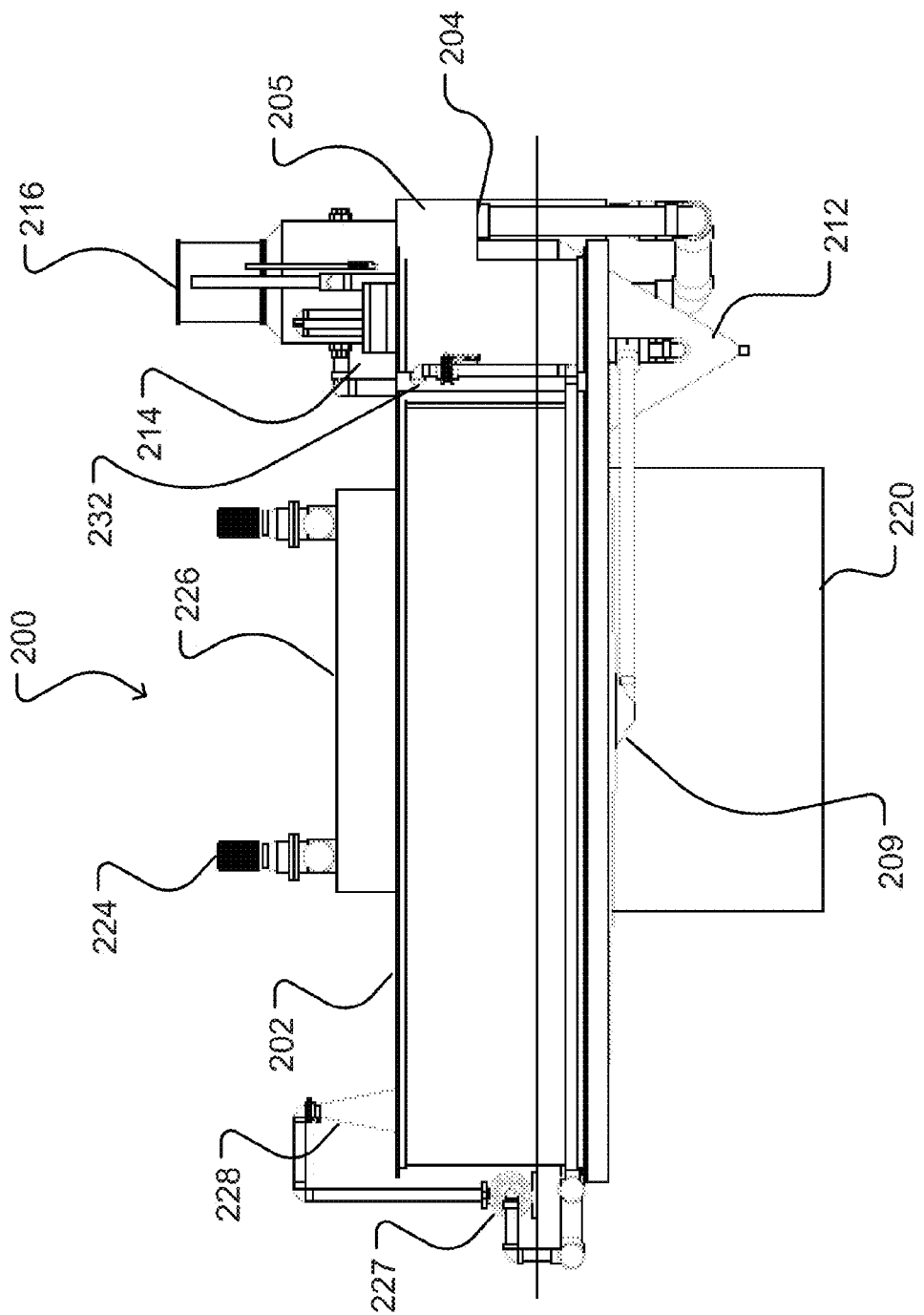
FIG. 11 is a left elevation view of the embodiment illustrated in FIG. 9.
Figure 12:
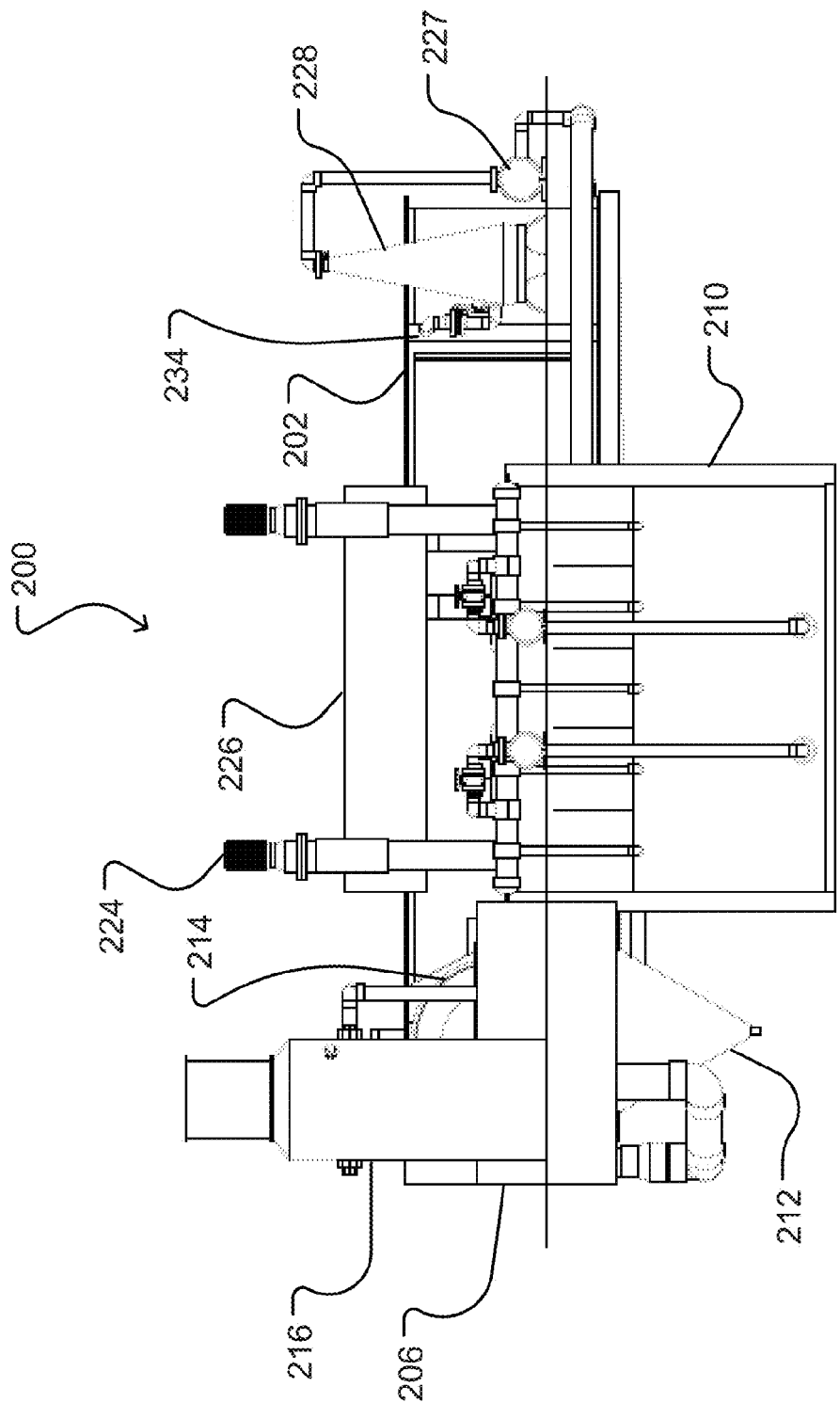
FIG. 12 is a right elevation view of the embodiment illustrated in FIG. 9.

FIG. 8 shows a general layout of a recirculating aquaculture system 150 according to an embodiment of the invention.

System 150 includes a rearing tank 152. Rearing tank 152 may be any of any size, any configuration, and made of any material compatible with the animal and/or plant species being reared. Some embodiments may have more than one rearing tank.

A first stream of water to be treated is drawn from near or at a bottom region of rearing tank 152. The first stream of water carries a significant proportion of the solid waste in the tank. The first stream of water is gravity fed to a solids separator 154 for solids removal. In some embodiments the first stream of water may be supplemented with water containing less solids drawn from a middle and/or top region of tank 152 to maintain the solids of the first stream suspended as the water is fed to solids separator 154. Solids separator 154 may for example be a radial flow separator or other suitable device. Effluent from solids separator 154 is gravity fed to a mechanical filter 156 for removal of fine solids. Mechanical filter 156 may for example be a drum filter or other suitable device.

A second stream of water to be treated is drawn from the middle and/or top region of tank 152, bypasses solids separator 154, and is gravity fed directly to mechanical filter 156. In some embodiments the second stream of water comprises about 70% to 90%, or about 75% to 85%, or about 80% of the water withdrawn from rearing tank 152 for treatment, with the balance of the water represented by the first stream of water.

Effluent from mechanical filter 156 is fed to a sump 158 in closed loop connection with a foam fractionator 159 for removal of dissolved proteins and other organic carbons. Water from sump 158 is gravity fed to biofilter 160 for removal of toxic nitrogenous wastes. In some embodiments, biofilter 160 may be like biofilter 10 or biofilter 110 described above.

Effluent from biofilter 160 is gravity fed to carbon dioxide stripper 162 for removal of carbon dioxide from the water. In some embodiments carbon dioxide stripper 162 may also add oxygen to the water. In some embodiments, carbon dioxide stripper 162 may be a surface agitation aerator or other suitable device.

In some embodiments where sequestration of carbon dioxide is desirable (e.g. where plant species are being reared), carbon dioxide stripper 162 may located in a shrouded chamber. A shroud of the chamber may for example be constructed of fibre-reinforced plastic, high density polyethylene or the like. Fans or blowers blow air into the chamber and force air enriched in carbon dioxide out of chamber to a suitable downstream process (e.g. plant rearing tank). In some embodiments, the fans or blowers may operate at about 0.1 to 2.0 psi (0.7 to 13.8 kPa), or at about 0.2 to 1.0 psi (1.4 to 7.0 kPa), or at about 0.5 psi (3.5 kPa). In some embodiments, the air flow may be a multiple of the water flow through the chamber of about 0.11 to 0.17, or about 0.14.

Water from carbon dioxide stripper 162 is pumped to header tank 164. Water in header tank 164 is gravity fed back to rearing tank 152. Some of the water from header tank 164 is sent to oxygenator 166 for additional oxygenation of the water before being returned to rearing tank 152. Oxygenator 166 may be an oxygenation cone, U-tube, or other suitable device.

FIGS. 9 to 12 show a recirculating aquaculture system 200 according to an example embodiment of the invention.

System 200 includes two rearing tanks 202. Each rearing tank 202 has a sidebox including a side outlet 204 through which some of the water to be treated is removed and gravity fed via conduits to pre-filtration tank 205.

Some of the water to be treated is removed from rearing tanks 202 through a top outlet 208. The normal operating water level of rearing tanks 202 is above top outlet 208. Water removed from top outlet 208 is combined with water removed from the bottom outlet 209 of rearing tanks 202, and gravity fed together via conduits to a radial flow separator 212 for solids removal. Effluent from radial flow separator 212 is gravity fed via conduits to pre-filtration tank 205.

Side outlet 204, top outlet 208 and/or bottom outlet 209 may have valves for controlling the volume of water removed from rearing tanks 202. The majority of the water to be removed from rearing tanks 202 bypasses radial flow separator 212 and is fed directly to pre-filtration tank 205 via side outlet 204.

Water collected in pre-filtration tank 205 is filtered by a drum filter 214. Effluent from drum filter 214 is gravity fed to sump 206. Sump 206 is connected to a foam fractionator 216 by a closed loop for removal of dissolved proteins and other organic carbons. Water in sump 206 is gravity fed by a weir 217 to biofilter 210 adjacent to sump 206.

Effluent from biofilter 210 is gravity fed from outlets 218 of biofilter 210 directly to adjacent chamber 220. The normal operating water level of chamber 220 is at substantially the same level as outlets 218 to minimize adding static head to system 200. Chamber 220 includes one or more surface agitation aerators (e.g. KASCO® aerators) for stripping carbon dioxide from, and adding oxygen to, the water. In the illustrated embodiment, chamber 220 is open.

Pumps 224 pump water from chamber 220 to header tank 226. In some embodiments the normal operating water level of header tank 226 is higher than the normal operating water level of rearing tanks 202 by about 10 to 26 inches (25 to 65 cm), or about 14 to 22 inches (35 to 55 cm), or about 18 inches (45 cm). Water from header tank 226 is gravity fed via conduits back to inlets 232 of rearing tanks 202. In the illustrated embodiment, a portion of water from header tank 226 is gravity fed to pumps 227 which pump the water to oxygenation cones 228 (e.g. SPEECE CONES™) to further oxygenate the water. Water from oxygenation cones 228 is then gravity fed via conduits back to rearing tanks 202 through inlets 234. Inlets 232 and 234 may be connected to spray bars (not shown) which return water to rearing tanks 202.

According to some embodiments, the total percentage volume of daily make up water needing to be added to the recirculation aquaculture systems ranges from about 1% to 5% for example to account for evaporation. In some embodiments, an additional amount of make up water my be necessary depending on the species being reared (e.g. up to 20% for salmonid species).

FIG. 13 shows a sample set of design calculations for an example embodiment of the invention. The results are based on a 175.5 kg feed/day for 17550 kg fish biomass. The results indicate that for this embodiment a total counter flow rate of about 10% of the total flow rate over the filtration medium is sufficient to provide sufficient nitrogenous waste removal where the media bed is about 2 feet (0.6 m) deep. In some example embodiments a total counter flow rate of about 15% of the total flow rate over the filtration medium is sufficient to provide for sufficient nitrogenous waste removal where the media bed is about 3 feet (1.0 m) deep.

FIG. 14 shows a sample set of energy cost calculations for an example embodiment of the invention. In some embodiments, energy consumption of less than 2 kWh per kg of whole fish produced can be achieved when the invention is applied, for example, to a land-based salmonid (e.g. Coho salmon) operation conducted at a large scale (e.g. 1000 metric ton/year production). This is approximately 50% less power consumption compared to some prior systems.

As will be apparent to those skilled in the art in the light of the foregoing disclosure, many alterations and modifications are possible in the practice of this invention without departing from the spirit or scope thereof. For example, instead of single array of chambers/media beds with a single array of water jet outlets, some embodiments may have two or more, stacked arrays of chamber/media beds each with a corresponding array of water jet outlets.

The invention claimed is:

1. A biofilter comprising:
    a housing;
    an inlet defining an upstream end of the housing;
    an outlet defining a downstream end of the housing;
    a chamber comprising an upstream opening and a downstream opening, the chamber configured to contain a filtration medium;
    a counter flow generator for generating a counter flow of water in an upstream direction in the chamber, wherein the counter flow generator comprises a water jet assembly comprising a water jet outlet.

2. A biofilter according to claim 1 wherein the water jet outlet is adjacent to the downstream opening of the chamber.

3. A biofilter according to claim 2 wherein the water jet assembly comprises an intake for supplying to the water jet outlet, wherein the intake is configured to draw water from within the housing downstream of the water jet outlet.

4. A biofilter according to claim 3 wherein the total counter flow of water generated is equal to about 10% of the total flow rate of water flowing downstream through the biofilter.

5. A biofilter according to claim 4 comprising a discharge manifold, the discharge manifold comprising:
   an intake adjacent to a bottom of the housing;
   the outlet defining the downstream end of the housing;
   a conduit connecting the intake to the outlet;
   wherein the outlet and a downstream portion of the conduit are located along a substantially horizontal plane adjacent to the downstream opening of the chamber.

6. A method of filtering in a biofilter comprising:
   (a) providing water from a source to a filtration medium;
   (b) allowing the water to flow through the filtration medium in a downstream direction by gravity;
   (c) simultaneously to step (b), providing a counter flow of water with one or more water jets through the filtration medium in an upstream direction.

7. A method according to claim 6 wherein step (c) further comprises providing a counter flow sufficient to, together with the gravity flow of water in the downstream direction, cause filtration medium to be churned between an upstream end of a media bed and a downstream end of the media bed.

8. A method according to claim 7 wherein step (c) comprises providing a total counter flow at a rate equal to about 10% of the total flow rate of water flowing downstream through the biofilter.

9. A method according to claim 8 wherein step (a) comprises providing water from the source to the filtration medium contained in a plurality of chambers.

10. A method according to claim 9 wherein step (c) comprises providing a continuous counter flow of water.

11. A recirculating aquaculture system comprising:
    a biofilter according claim 1; and
    a rearing tank in fluid communication with the inlet and the outlet of the biofilter.

12. A recirculating aquaculture system according to claim 11 wherein an elevation of an outlet of the rearing tank is sufficiently above an elevation of the inlet of the biofilter to permit gravity feed of water from the rearing tank to the biofilter.

13. A recirculating aquaculture system according to claim 12 comprising:
    a carbon dioxide stripping chamber directly downstream of the biofilter, the carbon dioxide stripping chamber comprising a surface agitation aerator, wherein a normal operating water level of the carbon dioxide stripping chamber is slightly below an elevation of the outlet biofilter.

14. A recirculating aquaculture system according to claim 13 comprising:
    a pump in fluid communication with the carbon dioxide stripping chamber;
    a header tank comprising an outlet in fluid communication with the rearing tank,
    wherein the pump is configured to pump water from the carbon dioxide stripping chamber to the header tank.

15. A recirculating aquaculture system according to claim 14 wherein an elevation of the outlet of the header tank is above an elevation of an inlet of the rearing tank to permit gravity feed of water from the header tank to the rearing tank.

16. A recirculating aquaculture system according to claim 15 comprising: a solids separator downstream of the rearing tank and upstream of the biofilter; a mechanical filter downstream of the rearing tank and upstream of the biofilter; a foam fractionator downstream of the rearing tank and upstream of the biofilter; and/or an oxygenator downstream of the biofilter and upstream of the rearing tank.

* * * * *